(12) United States Patent
Blais (10) Patent No.: US 7,245,304 B2
(45) Date of Patent: Jul. 17, 2007

(54) SYSTEM AND METHOD FOR MANAGING COMPRESSED GRAPHIC IMAGE DATA

(75) Inventor: Marc A. Blais, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 506 days.

(21) Appl. No.: 09/987,954

(22) Filed: Nov. 16, 2001

(65) Prior Publication Data
US 2003/0095127 A1   May 22, 2003

(51) Int. Cl.
*G06T 9/00* (2006.01)
*G06T 1/60* (2006.01)
*G09G 5/36* (2006.01)

(52) U.S. Cl. .................. 345/555; 345/553; 345/530

(58) Field of Classification Search ............. 345/777, 345/763, 854, 555, 543, 582, 419, 585, 544, 345/571, 540, 501, 530, 553; 382/232, 233, 382/128, 239, 248, 243, 107, 132; 358/1.18; 348/36; 341/51; 701/208
See application file for complete search history.

(56) References Cited

U.S. PATENT DOCUMENTS

| | | | |
|---|---|---|---|
| 4,630,234 A | 12/1986 | Holly | |
| 5,189,510 A | 2/1993 | Henaff et al. | |
| 5,420,608 A | 5/1995 | Choi et al. | |
| 5,497,434 A | 3/1996 | Wilson | |
| 5,576,736 A | 11/1996 | Miwa et al. | |
| 5,619,226 A | 4/1997 | Cahill, III | |
| 5,629,719 A | 5/1997 | Cahill, III | |
| 5,638,498 A * | 6/1997 | Tyler et al. | 358/1.18 |
| 5,640,496 A * | 6/1997 | Hardy et al. | 345/421 |
| 5,682,179 A | 10/1997 | Cahill, III | |
| 5,694,148 A | 12/1997 | Cahill, III | |
| 5,694,149 A | 12/1997 | Cahill, III | |
| 5,701,159 A | 12/1997 | Ohira et al. | |

(Continued)

FOREIGN PATENT DOCUMENTS

EP    0 388 282 A1    9/1990

(Continued)

OTHER PUBLICATIONS

Daniel D. Sleator, et al., "Amoritized Efficiency of List Update and Paging Rules", Communication of the Association for Computing Machinery, Association for Computing Machinery, vol. 28, No. 2, Feb. 1985, pp. 202-208. European Search Report dated Nov. 7, 2003.

*Primary Examiner*—Kee M. Tung
*Assistant Examiner*—Joni Hsu
(74) *Attorney, Agent, or Firm*—Miles & Stockbridge PC; James T. Carmichael (57) ABSTRACT

Compressed graphic image data files, such as Compressed ARC (Arc-second Raster Chart/map) Digitized Raster Graphics (CADRG) map files for a region of interest, are stored in blocks of memory (nodes) preferably arranged as a linked list. Portions of files containing data for an area of interest including an image of interest are decompressed before the data are sent to a frame buffer for display. Nodes that do not contain requested data are flagged as unused, but not deallocated, making the data in such nodes available for use or replacement.

17 Claims, 11 Drawing Sheets

U.S. PATENT DOCUMENTS

| | | | |
|---|---|---|---|
| 5,710,835 A | 1/1998 | Bradley | |
| 5,717,436 A | 2/1998 | Cahill, III | |
| 5,754,162 A | 5/1998 | Cahill, III | |
| 5,777,618 A | 7/1998 | Kita et al. | |
| 5,784,046 A | 7/1998 | Cahill, III | |
| 5,831,592 A | 11/1998 | Cahill, III | |
| 5,844,541 A | 12/1998 | Cahill, III | |
| 5,847,762 A | 12/1998 | Canfield et al. | |
| 5,953,017 A * | 9/1999 | Beach et al. | 345/440 |
| 5,999,189 A | 12/1999 | Kajiya et al. | |
| 6,366,289 B1 * | 4/2002 | Johns | 345/543 |
| 6,417,888 B1 | 7/2002 | Dunn et al. | |
| 6,515,673 B1 * | 2/2003 | Hashimoto et al. | 345/582 |
| 6,559,853 B1 * | 5/2003 | Hashimoto et al. | 345/582 |
| 6,567,081 B1 * | 5/2003 | Li et al. | 345/419 |
| 6,701,420 B1 * | 3/2004 | Hamilton et al. | 711/170 |

FOREIGN PATENT DOCUMENTS

| | | |
|---|---|---|
| EP | 0388282 | 9/1990 |
| EP | 0 528 152 A1 | 2/1993 |
| EP | 0528152 | 6/1996 |
| EP | 0 741 380 A2 | 11/1996 |
| EP | 0741380 | 11/1996 |
| EP | 0 993 184 A2 | 4/2000 |
| EP | 0993184 | 4/2000 |

\* cited by examiner

SYSTEM AND METHOD FOR MANAGING COMPRESSED GRAPHIC IMAGE DATA

FIELD OF THE INVENTION

This invention relates to graphic image display. More particularly, this invention relates to a system and method for efficiently managing compressed geographic image data, such as Compressed ARC (Arc-second Raster Chart/map) Digitized Raster Graphics (CADRG) data, and displaying images therefrom.

BACKGROUND

Many applications require storage and retrieval of data from among vast amounts of graphic image data. To reduce storage requirements, the image data is frequently stored on media in a compressed format. Conventional systems typically decompress an entire file containing data for an image before loading it into memory. The data for the image is then sent to a frame buffer for display on a display device. While decompression prior to loading data in memory may facilitate display, it does so at the expense of memory and hardware cost. The decompressed data will occupy much more memory than its compressed counterpart, increasing hardware cost and/or leaving less memory available for storing other data and for other purposes.

Conventional systems typically do not maintain files of interest in memory for repeated use. If sufficient memory is available, a first decompressed file may occupy a significant portion, if not all, of the available memory in a conventional system. When data from a second file is needed, memory in which the first decompressed file is stored is deallocated and the second file is decompressed and loaded into memory. If data from the first file is needed later, the entire process must be performed again, swapping the first file for the second file. As the system must access a disk to decompress and load the desired file into memory each time it is needed, this process is time consuming and inefficient and reduces response time.

Conventional systems are also typically unable to efficiently isolate data for a subsequent image from a decompressed file in memory. After displaying a first image from a decompressed file loaded in memory, many systems will reload the file from disk into memory to access data for a second image. This reloading operation entails accessing the disk and decompressing the file. Other systems will read and rewrite the entire decompressed file in memory to cull out data for the image of interest, a process which is conducive to memory fragmentation.

Such use of resources compromises the performance of a conventional graphic image display system by relying heavily on redundant disk access operations to load data into memory. Memory provides storage at a higher cost per megabyte than hard disks and CD-ROMs, but typically with relatively fast access and data transfer rates. In sharp contrast, hard disks and CD-ROMs provide relatively inexpensive non-volatile storage for large amounts of data, but take substantially more time to access and transfer data (often hundreds or thousands of times longer than the time taken to access data in memory), thereby creating a bottleneck.

Delays caused by accessing and transferring data from a disk can be particularly acute in the case of a conventional geographic display system, such as a system for displaying geographic images from CADRG data. Frequently, a sequence of images is displayed, starting with a first geographic image, then one or more other images for contiguous regions. Even if a single file contains the data for these images, many conventional systems must decompress the file and reload the data into memory to access the data for successive images. Common operations, such as flipping back and forth between two images, panning and cycling through a series of images, may entail multiple disk access, loading and decompression operations, consuming substantial time.

Instead of decompressing data for only an area of interest, conventional systems typically decompress an entire file, further compromising performance. Such indiscriminate decompression wastes both time and memory.

Frequent memory allocation and deallocation operations performed by conventional systems may further compromise performance. Such operations are conducive to memory fragmentation, especially in systems running multithreaded applications and multitasking operating systems, and consume valuable time. Memory can be viewed as a continuous range of allocatable cells. Fragmentation, the occurrence of unused gaps between useful cells in memory, can both increase the requirement for memory and slow down computation due to less efficient use of the storage hierarchy and complexity of memory access.

SUMMARY

It is therefore an object of the present invention to provide a system and method for efficiently managing compressed geographic image data, such as CADRG data.

It is another object of the invention to provide a system and method for storing compressed geographic image data, such as CADRG data, in memory and decompressing requested data for only an area of interest within a file before sending it to the frame buffer for display.

It is also another object of the invention to provide a system and method for maintaining compressed geographic image data, such as CADRG data, stored in memory for decompression and display as requested.

It is yet another object of the invention to provide a system and method that displays images from compressed geographic image data and reduces the likelihood of memory fragmentation.

It is a further object of the invention to provide a system and method that displays images from compressed geographic image data and stores requested graphic image data files in blocks of memory as nodes of a linked list.

It is also a further object of the invention to provide a system and method that displays images from compressed geographic image data, stores requested graphic image data files in blocks of memory as nodes of a linked list, with each node including a flag field for indicating whether or not the node is in use, and maintains unused nodes in the linked list and data in such nodes available for use and replacement.

To accomplish these and other objects of the present invention, a system and method are provided for storing compressed graphic image data, such as CADRG files, in blocks of memory (nodes) arranged as a linked list. Files are loaded in memory in compressed format, consuming substantially less memory than their decompressed counterparts. Only the portions of files that contain requested data are decompressed before the requested data are sent to the frame buffer for display. Once loaded in memory, a compressed file is maintained in memory for further use, until the memory is otherwise needed by another file containing data for a new region of interest. Nodes that do not contain requested data are flagged as unused, but not deallocated, making the data in such nodes available for use or replacement.

BRIEF DESCRIPTION OF THE DRAWINGS

The foregoing and other objects, features and advantages of the present invention will become better understood with reference to the following description, appended claims, and accompanying drawings, where:

DETAILED DESCRIPTION

The present invention provides a system and method for efficiently managing compressed graphic image data and displaying graphic images therefrom. The method involves storing compressed graphic image data, such as CADRG files, in blocks of memory (nodes) arranged as a linked list. Only the portions of files containing requested data are decompressed before the requested data are sent to the frame buffer for display. Nodes that do not contain requested data are marked as unused, but not deallocated, making the data in such nodes available for use or replacement.

Figure 1:
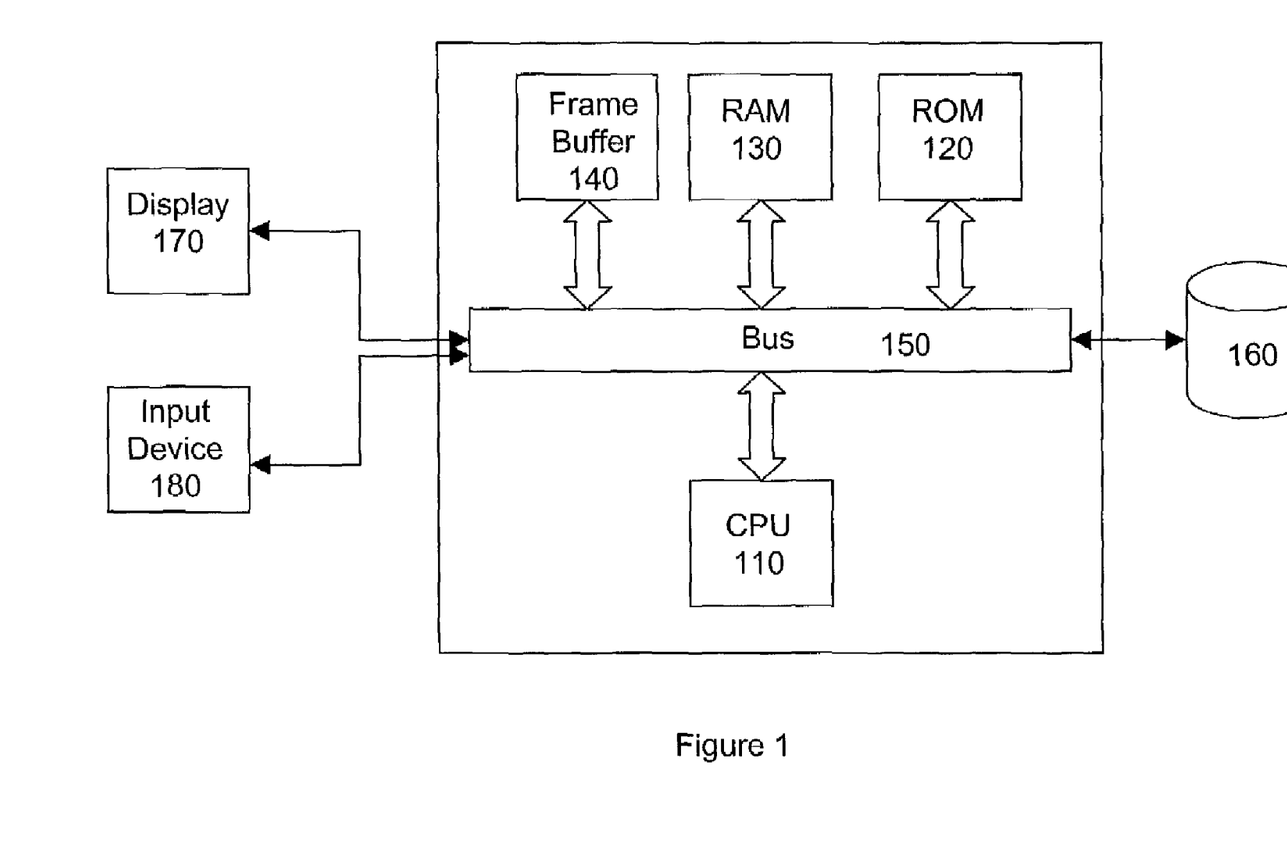
FIG. 1 is a block diagram of an exemplary graphic image display system for implementing the present invention.

Referring to FIG. 1, an exemplary system for displaying graphic images in accordance with the present invention preferably includes a bus 150 for communicating information, a central processing unit (CPU) 110, a read only memory (ROM) 120, random access memory (RAM) 130, a frame buffer 140, a storage device 160, a display device 170 and an input device 180. The storage device may include a hard disk, CD-ROM drive, tape drive, memory and/or other mass storage equipment. These elements are typically included in most computer systems and the aforementioned system is intended to represent a broad category of systems supporting image display devices. Of course, the system may include fewer, different and/or additional elements, provided it is capable of selectively processing compressed graphic image data and displaying images therefrom. Additionally, the system may either stand alone or operate in a distributed environment.

An image on the display device 170 is made up of individual dots known as pixels (short for picture elements). The frame buffer 140, which can be a designated part of main memory or a separate memory designed for image display, stores data representative of each pixel. The display 170 is usually serially addressed, with pixels being sent to the display one at a time, starting at the top left corner of the screen and scanning along each line sequentially until the bottom right corner is reached. For analog display devices, frame buffer data is typically translated from binary to one or more voltages for each pixel. To allow new image data to be generated while a current image is being scanned to the display, many conventional architectures include two frame buffers.

An important aspect of a preferred implementation of the present invention is that files containing desired image data are stored in memory in compressed format, rather than decompressed format as in conventional systems. Thus, the present invention efficiently uses available memory, with each stored file consuming substantially less memory than its decompressed counterpart. Conserved memory may be used for storing other data or for other purposes. This aspect of the present invention also facilitates implementation on systems with relatively little memory.

Another important aspect of a preferred implementation of the present invention is that only the portion of a file that includes data for an area of interest is decompressed. Decompression of data for an area of interest can typically be performed more quickly than decompression of an entire tile, and much more quickly than loading a file containing the data from a disk.

In a preferred implementation of the present invention the data may include CADRG map and chart data. CADRG is intended for use in a variety of military and civilian applications requiring map backgrounds, coordinate selection and perspective view generation. Military applications include mission planning systems, theater battle management systems and intelligence systems. Civilian applications include geological, environmental and navigational systems.

Figure 10:
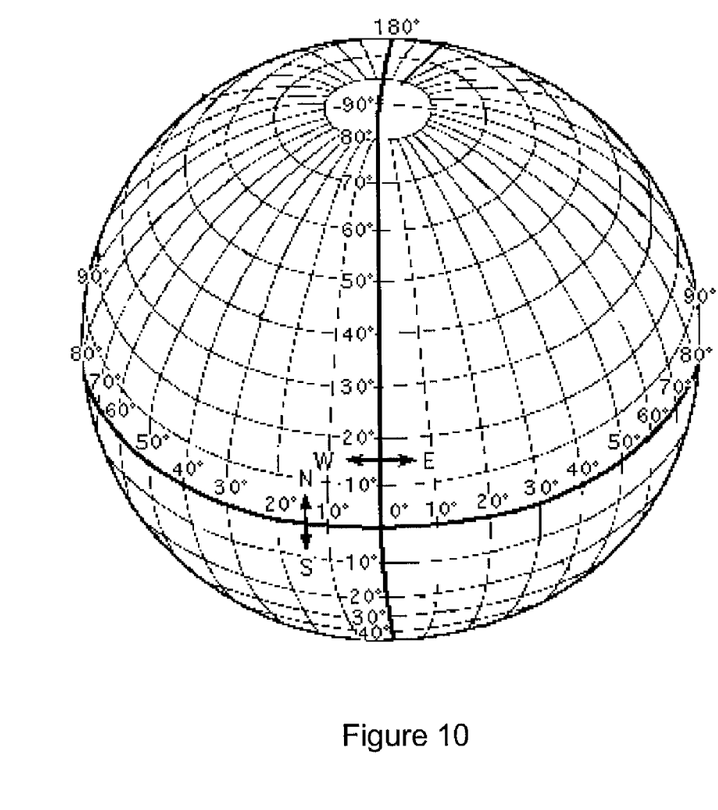
FIG. 10 is a perspective of a globe with latitudinal bands dividing the globe into 18 zones, with the northern and southern hemispheres each having 9 zones.

CADRG data are typically derived from digitized maps and charts. Original source graphics (maps and charts) for ADRG data, from which CADRG data are typically derived, are scanned at approximately a 100 micron ($\mu$) pixel resolution (254 pixels per inch) in both East-West and North-South directions, and then warped from the datum of the original paper map or chart to an ARC system of 18 latitudinal bands, transforming row and column coordinates for each pixel into latitude and longitude coordinates. Warping involves registering the raw maps and charts to known (control) coordinates. The registration record is then used to geometrically rectify the map or chart. The latitudinal bands encircle the earth's surface and divide it into 18 zones, with the northern and southern hemispheres each having 9 zones, as generally depicted in FIG. 10. To produce CADRG data, ADRG source data is spatially reduced to a 150$\mu$ pixel resolution (169 pixels per inch).

Figure 2:
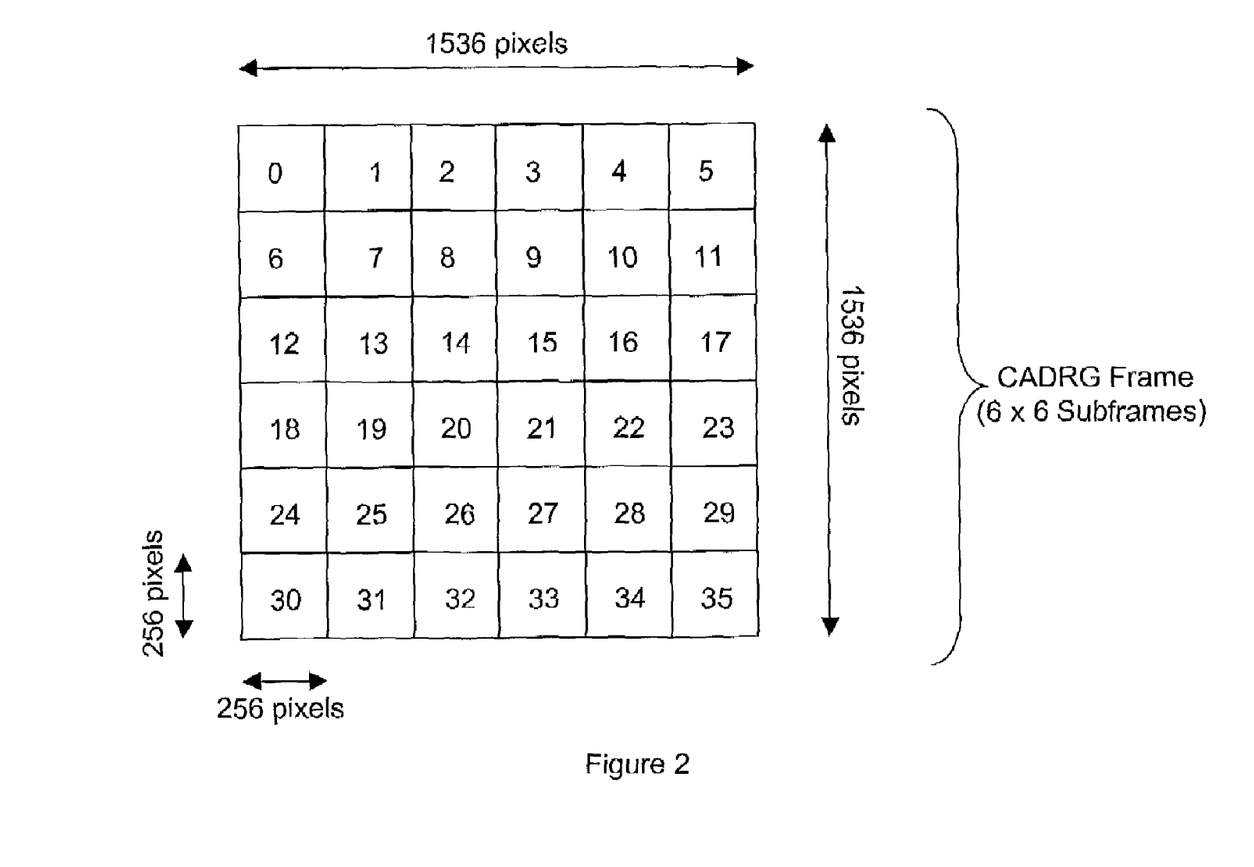
FIG. 2 shows conceptually a typical CADRG frame (or tile) comprised of 36 subframes, each having 65,536 pixels.

CADRG data are typically arranged as rectangular grids of frames of pixels, with a discrete file representing each CADRG frame, also known as a tile. Each frame or tile typically includes a rectangular array of 1536 by 1536 pixels (2,359,296 pixels) translated into a grid of 6 by 6 subframes (36 subframes), as shown in FIG. 2. Each subframe includes a rectangular array of 256 by 256 output pixel values (65,536 pixel values).

In addition to containing data representing each pixel, CADRG files contain overhead data. The overhead data include a coverage section that defines the geographical extent of the tile using sets of latitude and longitude vertices. Thus, the approximate latitude and longitude represented by any pixel in the 1536×1536 array comprising the tile can be determined for purposes of defining an area of interest.

CADRG data are compressed. Available colors in ADRG source data are typically quantized from a palette of 16.7 million colors to 216 colors, reserving 40 colors in an 8-bit system for other uses by application software. The 216 quantized colors (0 through 215) are defined in a color lookup table. A $217^{th}$ entry with null values may be reserved for transparent pixels. Each entry of the lookup table includes 4 bytes, one byte each for red, green and blue (RGB) intensity levels and a fourth byte for a monochrome (grayscale) intensity level.

The data are also spatially compressed into subframe arrays of 64×64 12-bit codes using vector quantization employing a 4×4 compression kernel size with 4096 codebook entries, each having 16 bytes. A compressed CADRG file may achieve substantial reductions in size, on the order of approximately 8:1.

Decompression, the inverse of the compression process, involves replacing the 12 bit codes with values from the tables to produce pixel values for use in display. A CADRG file includes all of the tables and codes required for decompression. Each 12-bit code in the 64×64 array is converted to a 4×4 block of 8-bit values, each ranging from 0 to 216. For a particular 12-bit code, there is an entry (or record) in each of four compression lookup tables. Each record addresses a row of the 4×4 block, providing four 8-bit values. The resulting 8-bit values from the four compression tables are combined to form the 4×4 block. Each 8-bit value in the 4×4 block is an index in the color lookup table that provides an RGB or monochromatic (grayscale) value.

After each 12-bit code has been converted to a 4×4 block of 8-bit values(indices), the indices are replaced with RGB or monochromatic (grayscale) pixel values from the color look-up table. Each pixel of a final RGB output image, therefore has a 24-bit argument.

As used herein, a region of interest means a geographic region that includes an area of interest. An area of interest means a geographic area that includes a geographic image for display. The area of interest preferably includes areas contiguous to the area covered by the geographic image for display. The geographic region preferably includes areas contiguous to the area of interest. To illustrate, a geographic region may include substantial portions of Indiana, Ohio and Kentucky. An area of interest within that geographic region may include Dayton, Ohio and surrounding areas. A geographic image for display within the area of interest may include Wright-Patterson Air Force Base.

In a preferred implementation of the present invention, only the portion of a CADRG tile that includes data for an area of interest is decompressed. This decompression process is referred to herein as "partial decompression." The area of interest includes the area to be displayed and, preferably, some surrounding areas to facilitate panning. While the area of interest may comprise an entire CADRG tile (1536×1536 pixels), preferably it comprises only a portion of a CADRG tile. For example, the area of interest may include 1024×768 pixels (one third of a CADRG tile), which exceeds the pixel display capability of many display devices. Additionally, several CADRG tiles may collectively include the data for the area of interest, requiring data from multiple files. An important advantage of partial decompression is that it can typically be performed more quickly than decompression of an entire tile, and much more quickly than loading a file containing the data from a disk. Another important advantage is that the decompressed data for the area of interest typically consumes less memory than the decompressed data for the entire tile.

Partial decompression involves identifying the 12-bit codes for the area of interest and performing the decompression process, as described above, for those codes. Codes corresponding to the area of interest may be determined from the reference latitude and longitude vertices contained in the CADRG file, or by relation to specific reference codes (e.g., codes defining an edge of a previous image). Each 12-bit code corresponds to a 4×4 array of pixel values for the CADRG tile, thus representing specific geographic points within the covered geographic area. For example, a CADRG tile may cover an area defined by −85.75° to −83.25° longitude and 38.88° to 40.12° latitude, which encompasses portions of Indiana, Ohio and Kentucky, including the cities of Cincinnati and Dayton, Ohio. An area of interest within the tile may be defined by 12-bit codes in the 37th through $53^{rd}$ (from left to right) columns of the $16^{th}$ through $24^{th}$ rows (from top to bottom) of the 64×64 array. This area of interest extends from approximately −84.34° to −83.72° longitude and 39.65° to 39.96° latitude, which includes Dayton, Ohio, Wright-Patterson Air Force Base and Springfield, Ohio.

Another important aspect of the present invention is that it provides means for efficiently managing compressed files in memory. A file that includes data requested for display, once loaded in memory, is maintained in memory until the data in that file is no longer required for display and the memory is requested for a new file that includes data for a new area of interest. By maintaining the file in memory, the data in that file remains available for display without having to access and load the file from a hard disk. Thus, the present invention reduces time consuming disk operations. Furthermore, maintaining the data in memory reduces the number of memory reallocation operations, making memory fragmentation less likely.

Figure 4:
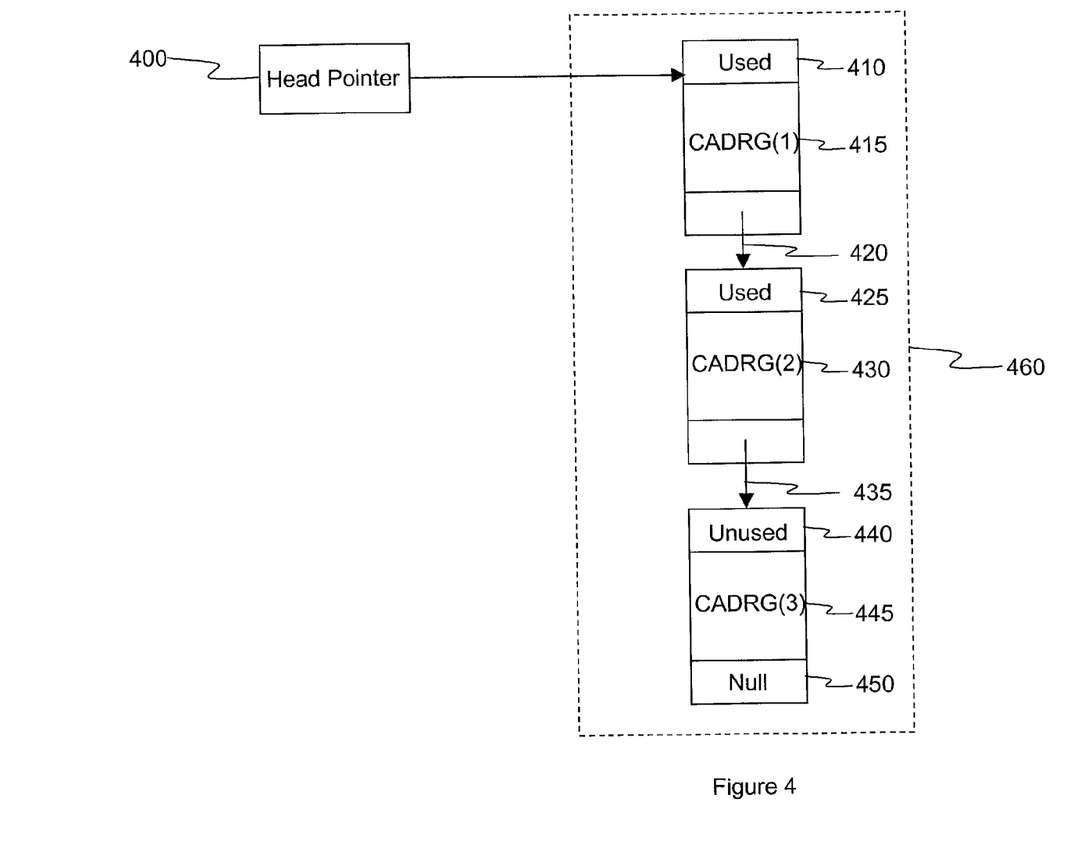
FIG. 4 is a schematic of a linked list comprised of nodes and a head pointer in accordance with a preferred implementation of the present invention.

In an exemplary implementation, requested CADRG files are stored in blocks of memory as nodes (415, 430 and 445) of a linked list in a heap 460, as depicted in FIG. 4. Each node continues to exist until it is explicitly deallocated.

Figure 3:
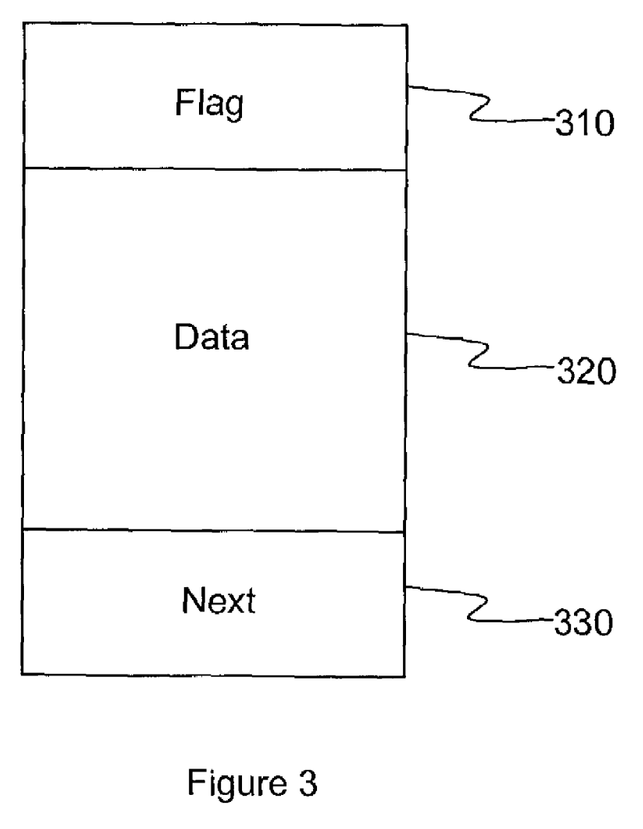
FIG. 3 depicts a block of memory (or node) comprised of a flag field, a data field and a next field in accordance with a preferred implementation of the present invention.

A node, as conceptually shown in FIG. 3, preferably includes three fields—a flag field 310, a data field 320 and a next field 330. The flag field 310 includes a used/unused flag for indicating whether or not the node is in use. The data field 320 stores the compressed CADRG file, preferably as an object. The next field 330 includes a pointer linking the node to the next node in the list.

Referring again to FIG. 4, the beginning of the linked list is stored in a "head pointer" 400 (e.g., as a local pointer in the stack), which points to the first node. The first node 415 contains a flag field marked as used 410 and a pointer 420 to the second node 430. The second node 430 contains a flag field marked as used 425 and a pointer 435 to the last node 445, . . . and so on. The last node 445 has a null pointer 450 marking the end of the list. Any node in the list can be accessed by starting at the head and following the next pointers.

Figure 11:
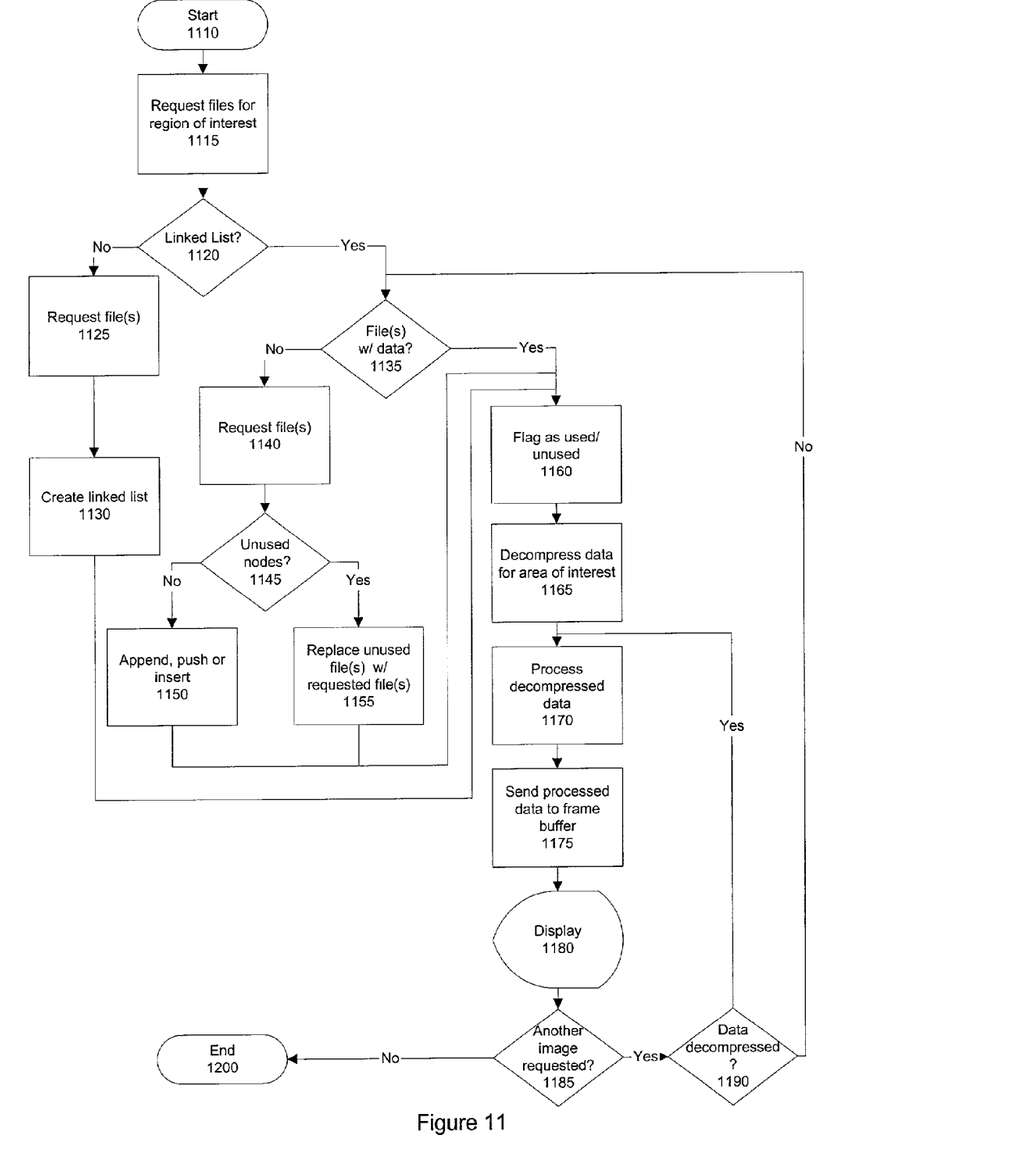
FIG. 11 is a flowchart of an exemplary process for managing compressed image data and displaying images therefrom in accordance with the present invention.

Referring now to FIG. 11, a flowchart for an exemplary process implementing the present invention is shown. In step 1115, an application makes a function call requesting certain files that include data for a region of interest. The region of interest preferably includes the area of interest and contiguous areas to facilitate panning. The size of the area may be a function of the memory available for storing such files. The request may include a reference point (e.g., a center point or corner) and a size (e.g., a radius or a width and height) for defining a geographic area of interest in relation to the reference point. The request may be user driven, as where a user specifies a region to view, or application driven, as in a navigation or positioning system that displays an area determined by computation.

Next it is determined whether a linked list exists, as in step 1120. If a linked list does not exist, as might be the case upon starting an application, the files containing the data for the region of interest are requested, as in steps 1120 and 1125. The files are then stored in memory as a linked list, as in step 1130, and ready for flagging, decompression, processing and display.

Should step 1120 determine that a linked list exists, it is then determined whether the list includes the files containing the desired data, as in step 1135. If the list includes the files, they are ready for flagging, decompression, processing and display. If the list does not include the files, the files must be requested, as in step 1140, and included in the list.

Figure 5:
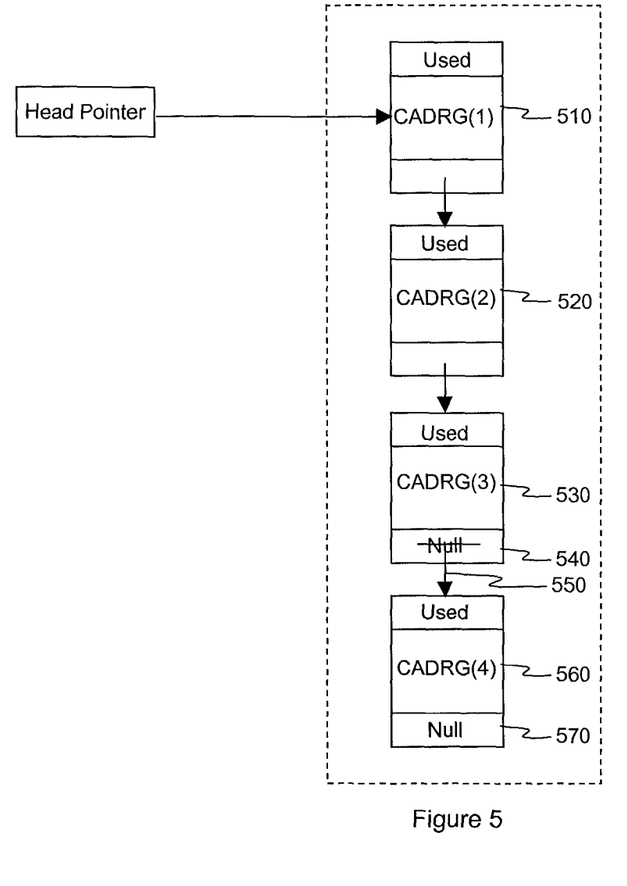
FIG. 5 is a schematic of a linked list that illustrates the process of appending a node in accordance with a preferred implementation of the present invention.
Figure 6:
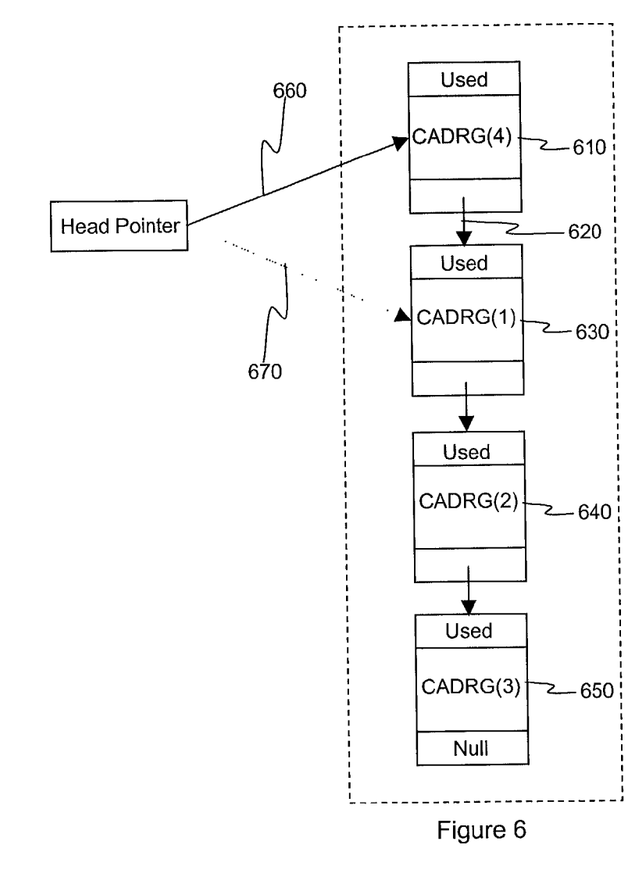
FIG. 6 is a schematic of a linked list that illustrates the process of pushing a node in accordance with a preferred implementation of the present invention.
Figure 7:
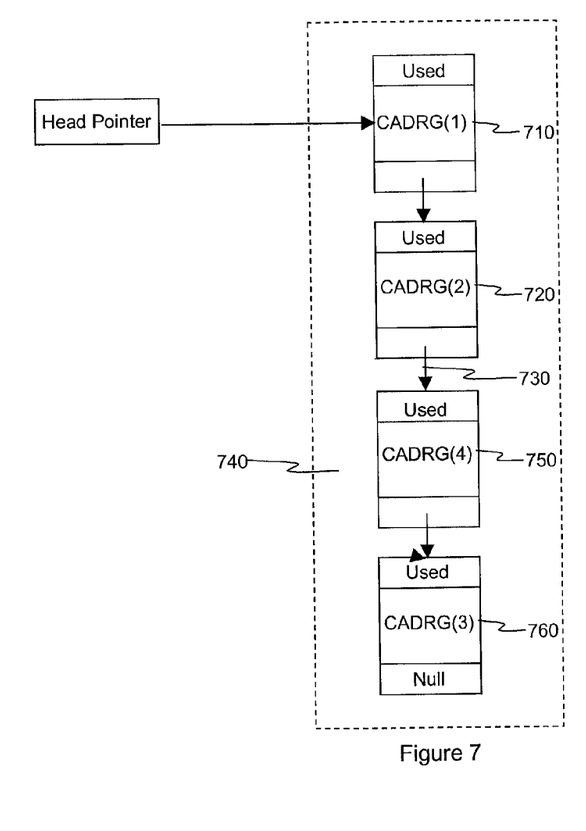
FIG. 7 is a schematic of a linked list that illustrates the process of inserting a node in accordance with a preferred implementation of the present invention.

The method of inclusion depends upon whether or not the list includes unused nodes (step 1145). If the list does not include unused nodes, the requested files are included in new nodes added to the list, as in step 1150, preferably by appending to the tail end, though they may be pushed to the head end or inserted somewhere between the head and tail ends of the linked list, as shown in FIGS. 5 through 7. Appending, as conceptually shown in FIG. 5, involves locating the last node 530 in the list and changing the null pointer 540 to a pointer 550 to the new node 560, which in turn will have a null pointer 570 to mark the end of the list. Pushing, as conceptually shown in FIG. 6, involves changing the head pointer from the first node 670 to the new node 660, which in turn will have a pointer 620 to the next node 630 (previously the first node). Insertion, as conceptually depicted in FIG. 7, involves changing the pointer 740 of the node 720 before the inserted position to a pointer 730 to the new node 750, which in turn will have a pointer 755 to the node 760 after the inserted position. Upon such appending, pushing or insertion, the files containing the requested data are stored in memory in the linked list and ready for flagging, decompression, processing and display.

Figure 8:
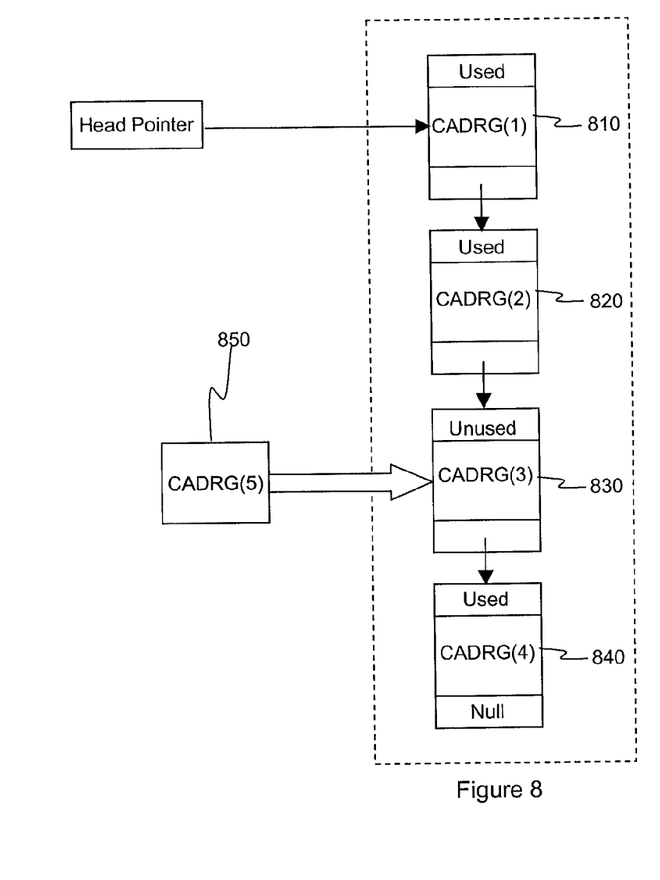
FIG. 8 is a schematic of a linked list that illustrates the process of replacing data in an unused node in accordance with a preferred implementation of the present invention.

Referring again to FIG. 11 and step 1145, if the list includes unused nodes, files requested in step 1140 will replace files in the unused nodes, as in steps 1145 and 1155. To illustrate the replacement process, FIG. 8 shows a linked list with four nodes. The first two nodes 810 and 820 and the fourth node 840 are flagged as used. The third node 830 is flagged as unused. If a function call is made requesting file CADRG(5), that file will replace CADRG(3) in the third node. Because CADRG files of interest for most (non-polar) applications are approximately the same size, such replacements typically do not create gaps in memory or require substantial restructuring of the linked list. When performed using standard I/O (input/output) operations, the replacement step does not require memory allocation and deallocation. Upon such replacement, the tiles containing the requested data are stored in memory in the linked list and ready for flagging, decompression, processing and display.

Referring back to FIG. 11, after files containing data for the region of interest are stored in memory in the linked list, nodes are flagged, as in step 1160. Nodes that include files which contain data for the region of interest are flagged as used. Nodes that include files which do not contain data for the region of interest are flagged as unused.

Figure 9:
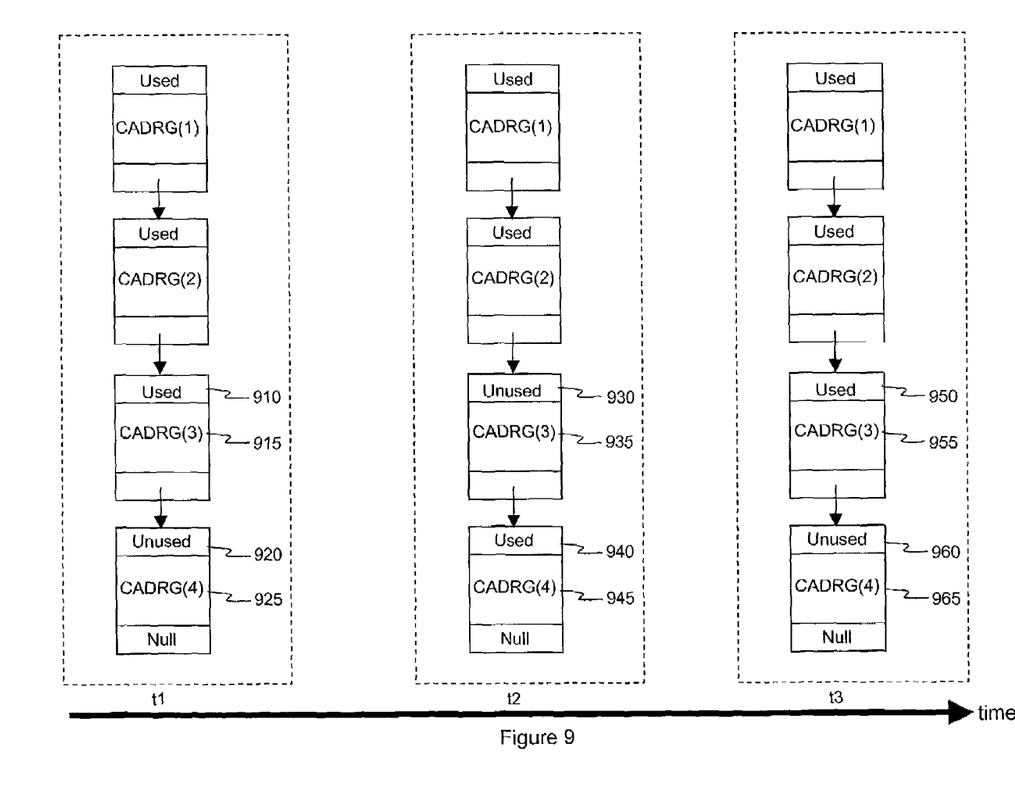
FIG. 9 is a schematic of a linked list that illustrates the process of flagging nodes as used or unused over a period of time, t1 to t3, in accordance with a preferred implementation of the present invention.

To illustrate the flagging process, FIG. 9 conceptually depicts a linked list at three distinct times, t1, t2 and t3. At time t1, the third node 915 is flagged as used 910 and the fourth node 925 is flagged as unused 920. Though the fourth node is unused at time t1, it is not deallocated and its file (CADRG(4)) remains available for use. At time t2, the file in the fourth node 945 is required and available for use without reallocation. Thus, the fourth node 945 is then flagged as used 940. Also at time t2, the file in the third node 935 is no longer required and, thus, flagged as unused 930. At time t3, the third and fourth nodes 955 and 965 return to the same used/unused states 950 and 960 as at time t1. By maintaining the unused nodes in the linked list, several deallocation, reallocation, disk access and loading operations are avoided.

After flagging, data for the area of interest are decompressed, as in step 1165, and the decompressed data are stored in available memory. Preferably, only the portion of the file that includes data for the area of interest is decompressed, as discussed above for partial decompression of a tile. Upon decompression, the data for the geographic image for display are processed (i.e., culled from the data for the area of interest) 1170, sent to the frame buffer 1175 and an image is displayed based on the data 1180. The decompressed data stored in available memory, whether in main memory or the frame buffer, may be retained in memory for further use until that memory is otherwise needed.

After the image has been displayed, the application may make another function call requesting different data for another area of interest, as in step 1185. Again, the request may include a reference point (e.g., a center point or corner) and a size (e.g., a radius or a width and height) for defining a geographic area of interest in relation to the reference point. The request may be user driven, as where a user specifies a region to view, or application driven, as in a navigation or positioning system that displays a computed area. In step 1190, if the data for the area of interest are already stored in decompressed form in memory for use, control is returned to step 1170 and the process continues. However, if the data for the area of interest is not already stored in decompressed form in memory for use, control is returned to step 1135 and the process continues.

While the foregoing description discloses use of CADRG data in a preferred implementation, other compressed graphic image data, whether geographic or non-geographic, may instead be used, and comes within the scope of the present invention. Preferably, such other data are contained in a file that can be partially decompressed, and typically in less time than it would take to either fully decompress the file or load the decompressed data into memory from a hard disk, CD-ROM, or other mass storage device. The compressed files of interest for such other data preferably include all data needed for decompression. Additionally, the compressed files of interest for such other data preferably have approximately the same size, to facilitate replacing data in unused nodes.

The foregoing detailed description of a particular preferred implementation of the invention, which should be read in conjunction with the accompanying drawings, is not intended to limit the enumerated claims, but to disclose particular examples of the invention. Those skilled in the art should appreciate that they can readily use the concepts and specific implementations disclosed as bases for modifying or designing other methods and systems for carrying out the same purposes of the present invention. Those skilled in the art should also realize that such equivalent methods and systems do not depart from the spirit and scope of the invention as claimed.

The invention claimed is:

1. A system for displaying a graphic image of interest based on compressed graphic image display data that include compressed data for the graphic image of interest, said system comprising:
   a memory;
   means for storing the compressed graphic image display data in the memory with a linked list in the memory, said linked list including a plurality of nodes, wherein each node comprises a flag field for flagging the node as unused if the node does not include compressed graphic image display data for the graphic image of interest;
   means for selectively decompressing a portion of said compressed graphic image display data as stored in the memory based on a selected coverage section of the graphic image display data, said portion including only relevant data corresponding to the graphic image of interest; and
   display means for displaying the graphic image of interest based exclusively on the portion of the compressed graphic image display data as decompressed.

2. The system for displaying a graphic image of interest as in claim 1, wherein said means for storing the compressed graphic image display data in the memory further includes means for storing the compressed graphic image display data in a node in the linked list.

3. The system for displaying a graphic image of interest as in claim 2, wherein said means for storing the compressed graphic image display data in a node in the linked list further includes:
   means for determining if any nodes in the linked list are flagged as unused, and
   means for replacing compressed graphic image display data in a node flagged as unused, if any in the linked list, with the compressed graphic image display data that include compressed data for the graphic image of interest.

4. The system for displaying a graphic image of interest as in claim 3, wherein said means for storing the compressed graphic image display data in a node in the linked list further includes means for adding to the linked list a node for storing the compressed graphic image display data if no nodes in the linked list are flagged as unused.

5. The system for displaying a graphic image of interest as in claim 4, wherein said display means includes means for generating a graphic image based on the portion of the compressed graphic image display data as decompressed.

6. The method for displaying a graphic image of interest as in claim 1, wherein the compressed display data that defines the graphic image data and includes latitude and longitude vertices.

7. The system for displaying a graphic image of interest as in claim 1, wherein when the flag field for flagging the node as unused is set, the node flagged as unused remains in the linked list.

8. A method for displaying a requested graphic image from data included in a compressed graphic image display data file, said method including the steps of:
   loading the file into one of a plurality of nodes of a linked list in a memory, wherein each node comprises a flag field;
   flagging, using the node flag field, the node as unused if the node does not include compressed graphic image display data for the requested graphic image;
   decompressing a portion of the file as loaded into the memory, said portion including only relevant data for the requested graphic image based on a selected geographical region;
   sending the data for the requested graphic image from the portion of the file as decompressed to a frame buffer; and
   generating the requested graphic image on a display device based exclusively on the data as decompressed and which is sent to the frame buffer.

9. The method for displaying a requested graphic image from data included in a compressed graphic image display data file as in claim 8, wherein the step of loading the file into one of a plurality of nodes further includes the steps of:
   determining if any nodes in the linked list are flagged as unused, and
   loading the file into a node flagged as unused, if any in the linked list.

10. The method for displaying a requested graphic image from data included in a compressed graphic image display data file as in claim 9, wherein the step of loading the file into one of a plurality of nodes further includes the step of adding to the linked list a node for storing the file if no nodes in the linked list are flagged as unused.

11. The method for displaying a requested graphic image of interest as in claim 8, further comprising:
   maintaining in the linked list the node flagged as unused when the node flag field is set.

12. A method for displaying geographic images from compressed geographic image display data files stored on a storage device, said compressed geographical image display data files including a file that includes compressed data for a first area of interest, said method including the steps of:
   receiving a request for the first area of interest;
   loading the file that includes compressed display data for the first area of interest from the storage device into one of a plurality of nodes of a linked list in a memory, wherein the compressed display data includes overhead data that defines a geographical extent of the file, wherein the overhead data includes latitude and longitude vertices, wherein each node comprises a flag field;
   flagging, using the node flag field, as unused nodes in the linked list that do not include compressed display data for the first area of interest;
   decompressing a portion of the file as loaded into memory based on the received request for the first area of interest, said portion including data corresponding to the first area of interest;
   sending the data for the portion of the file as decompressed to a frame buffer; and
   generating a geographic image for the first area of interest on a display device based on the data in the frame buffer.

13. The method for displaying geographic images as in claim 12, wherein the step of loading the file includes the steps of:
   determining if any nodes in the linked list are flagged as unused, and
   loading the file into a node flagged as unused, if any in the linked list.

14. The method for displaying geographic images as in claim 13, wherein the step of loading the file includes the step of adding to the linked list a node for storing the file if no nodes in the linked list are flagged as unused.

15. The method for displaying geographic images as in claim 12, further comprising:
   maintaining in the linked list the node flagged as unused when the node flag field is set.

16. A system for displaying a graphic image of interest, comprising:
   means for storing the compressed graphic image display data in the memory comprising a linked list in the memory, said linked list including a plurality of nodes, wherein each node comprises a flag field for flagging the node as unused if the node does not include compressed graphic image display data for the graphic image of interest;
   means for selectively decompressing a portion of said compressed graphic image display data in a tile as stored in the memory based on a selected coverage section of the graphic image data; and
   display means for displaying the graphic image of interest based exclusively on the portion of the compressed graphic image display data as decompressed.

17. The system for displaying a graphic image of interest as in claim 16, wherein when the flag field for flagging the node as unused is set, the node flagged as unused remains in the linked list.

* * * * *